United States Patent
Cutler et al.

[11] Patent Number: 6,149,963
[45] Date of Patent: *Nov. 21, 2000

[54] METHOD FOR TREATING A LIQUID EGG PRODUCT

[75] Inventors: Joel Cutler, Bluebell, Pa.; Adriaan Gerrit Den Hollander, Gorinchem; Albert Jacobus Ros, Harderwyk, both of Netherlands

[73] Assignees: Cutler Egg Products, Inc., Philadelphia, Pa.; Den Hollander Engineering B.V., Gorinchem, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/715,094

[22] Filed: Sep. 17, 1996

[30] Foreign Application Priority Data

Sep. 21, 1995 [NL] Netherlands ............... 1001250

[51] Int. Cl.⁷ ........................................ A23L 1/32
[52] U.S. Cl. ............................ 426/614; 426/511
[58] Field of Search ...................... 426/614, 511

[56] References Cited

U.S. PATENT DOCUMENTS

| | | |
|---|---|---|
| 3,113,872 | 12/1963 | Jones et al. . |
| 3,166,424 | 1/1965 | Stewart et al. . |
| 4,675,202 | 6/1987 | Wenger et al. . |
| 4,808,425 | 2/1989 | Swartzel et al. . |
| 4,838,154 | 6/1989 | Dunn et al. ............... 99/451 |
| 4,853,238 | 8/1989 | Huang . |
| 4,877,625 | 10/1989 | Dieu et al. . |
| 4,957,760 | 9/1990 | Swartzel et al. . |
| 5,019,407 | 5/1991 | Swartzel et al. . |
| 5,028,448 | 7/1991 | Ros . |
| 5,105,724 | 4/1992 | Swartzel et al. . |
| 5,290,583 | 3/1994 | Reznik et al. . |
| 5,533,441 | 7/1996 | Reznik et al. . |
| 5,741,539 | 4/1998 | Knipper et al. . |

FOREIGN PATENT DOCUMENTS

| | | |
|---|---|---|
| 0 179 946 A1 | 5/1986 | European Pat. Off. . |
| 1315134 | 4/1963 | France . |
| 2 609 601 | 7/1988 | France . |
| 58-111663 | 7/1983 | Japan . |
| 627339 | 8/1949 | United Kingdom . |
| 818003 | 8/1959 | United Kingdom . |
| WO 90/09109 | 8/1990 | WIPO . |
| WO 93/12673 | 7/1993 | WIPO . |
| WO 97/10718 | 3/1997 | WIPO . |

OTHER PUBLICATIONS

Kline et al, *Food Technology*, pp. 105–114, Nov. 1965.
Sugihara et al, *Food Technology*, pp. 100–107, Aug. 1966.

*Primary Examiner*—Anthony J. Weier
*Attorney, Agent, or Firm*—Oblon, Spivak, McClelland, Maier & Neustadt, P.C.

[57] ABSTRACT

A method for treating a liquid egg product containing egg white and/or egg yolk in order to obtain an extended shelf life. The egg product is subjected to a pasteurization treatment, whereby the egg product is maintained at a temperature of about 60° C. or more for some time. The egg product is also briefly heated to a temperature of about 78° C. or more. Cooling then takes place with a quick temperature decrease.

32 Claims, 2 Drawing Sheets

METHOD FOR TREATING A LIQUID EGG PRODUCT

BACKGROUND OF THE INVENTION

1. Field of the Invention

The invention relates to a method for treating a liquid egg product containing egg white and/or egg yolk in order to obtain an extended shelf life, where the egg product is subjected to rapid heating and to a pasteurization treatment, whereby the egg product is maintained at a temperature of more than approximately 60° C. for some time, for example a few minutes.

2. Discussion of the Background

The use of a pasteurization treatment is a generally known method which is, for example, described in U.S. Pat. No. 4,808,425. According to this patent an egg product is subjected to a temperature of 63–72° C. for a period of time ranging from a few seconds to more than three minutes. The egg product is heated to the desired temperature by means of a plate-type heat exchanger, and after having been maintained at that temperature for a sufficiently long period of time, the egg product is cooled down to a temperature below 10° C. and subsequently packed. According to this patent, a more intensive heat treatment will result in coagulation of the egg product, especially the loss of solubility of protein, which amounts to more than 15% and is unacceptable. The loss of functional properties of the egg product, which is still acceptable according to this patent, imposes considerable limitations with regard to the applications of the pasteurized egg product, however.

U.S. Pat. No. 4,957,760 teaches a method of ultrapasteurizing a liquid egg product by contacting the egg product to steam. Preferably, the steam is held at not less than atmospheric pressure and the temperature of the product is not raised more than about 37° F. in this heating step. Following the direct steam heating step, the steam heated product is subjected to a holding time sufficient to cause at least a 9 log cycle reduction of Salmonella bacteria in the product. The holding time is preferably at least 10 seconds long and is taught as reducing the operating problems inherent in processes in which a product is contacted with steam under a vacuum.

U.S. Pat. No. 3,113,872 discloses a method of treating liquid egg products in which liquid egg is first heated by contact to a heated surface and then cooled, followed by a second heating step in which the egg product is contacted to steam followed by a second cooling step. In the steam heating step, the egg is heated to a temperature between 155–165° F. (68.33–73.89° C.) for about 1 second under a vacuum. In the steam heating chamber, a portion of the liquid egg impinges on the walls of the chamber and runs to the bottom of the chamber through the steam atmosphere.

Sugihara et al, "Heat Pasteurization of Liquid Whole Egg", 1966, *Food Technology*, 20(1) pp. 100–107 discloses heat pasteurizing liquid whole egg in which liquid egg is heated by two temperatures of 150–170° F. (65.56–76.67° C.) under vacuum, for 2–3 seconds. During operation, the liquid egg passes through a plate heating section and then into a cylindrical steam-infusion chamber where the liquid egg is distributed as a thin film along the sides of the chamber where it is heated for 2–3 seconds by steam introduced into the chamber. A similar process is described by Kline et al, "Heat Pasteurization of Raw Liquid Egg White", 1965, *Food Technology*, 19, pp. 105.

Although known pasteurization treatment will result in an egg product having a reasonable shelf life, dependent on the quality of the basic product and the setting of the treatment plant, there is a need for a method for treating a liquid egg product, which makes it possible, by using a reliable process, to obtain an egg product having an extended shelf life which meets all quality requirements and whose functional properties have hardly diminished, it at all.

Further, conventional pasteurization of egg products is known to kill most bacteria. However, some bacteria are particularly resistant to pasteurization under conventional conditions, for example *Bacillus cereus*. A need continues to exist for heat treatment procedures with improved bacteria killing properties.

A continuing problem in the treatment of liquid egg products is the necessity to pasteurize the egg product at a sufficiently high temperature to effect pasteurization and yet at a temperature low enough to prevent loss of physical and functional properties of the egg product. This problem is compounded by the necessity to kill a wide range of bacteria which may be present in the egg product and, specifically, bacteria which have demonstrated a resistance to pasteurization. Processing conditions which are insufficient to adequately pasteurize the egg product and achieve sufficient bacterial killing result in a packaged product with an unsatisfactorily short shelf life. The present invention solves the problem noted above by providing processing conditions which pasteurize the egg product in a way which maintains the functional and physical properties of the egg product and achieves high bacterial killing to provide a packaged egg product with long shelf life.

SUMMARY OF THE INVENTION

One object of the invention is to provide a method for treating a liquid egg product wherein all the above requirements are met.

This and other objects which will become apparent in the course of the following description of exemplary embodiments have been achieved according to the present invention in which the egg product is subjected to a brief heat treatment at relatively high temperature in addition to pasteurization. The method of the invention provides an egg product with an extended shelf life.

BRIEF DESCRIPTION OF THE DRAWINGS

FIG. 1 only shows the main components, while further components which are generally known in the art, such as measurement and control apparatus, are not shown.

DETAILED DESCRIPTION OF THE PREFERRED EMBODIMENTS

The egg product of the invention may be the liquid portion of a whole egg, that is, both the egg white and the egg yolk, wherein any further additives, such as sugars or salt may be present.

In the present invention, the egg product is subjected to a brief heat treatment at a temperature of a least 78° C., preferably about 80–90° C. The temperature during the brief heat treatment should not be so high as to coagulate the egg product. Generally, the brief heat treatment will be conducted at a temperature less than about 95° C. The brief heat treatment may last less than 1.5 seconds, preferably less than 1 second, and even more preferably less than 0.6 second.

Tests have shown that when conventional pasteurization treatment of an egg product is combined with a brief heat treatment to a relatively high temperature, an egg product having a long shelf life is obtained, whose functional properties have diminished only slightly, if at all, while an unexpectedly high bacteria killing rate is achieved.

In particular, the method of the present invention is able to kill *Bacillus cereus* in egg products to a much greater extent than conventional pasteurization. The process of the invention, therefore, produces an extended shelf life egg product having a higher bacteria kill, in particular, a lower *Bacillus cereus* bacteria count. The extended shelf life egg product of the invention is distinguishable from prior art egg products by having a very low bacteria count even after long storage. In a preferred embodiment, the extended shelf life egg product of the invention contains less than 1000, preferably less than 100, more preferably less than 10 live bacteria cells per gram of egg product after storage for 8 weeks at 4° C. and even at 20° C., and has a bacteria count of less than 1000, preferably less than 100, more preferably less than 10 live bacteria per gram even after 10 weeks of storage at 4° C. and even at 20° C. Even bacteria which are relatively heat resistant such as *Bacillus cereus* are generally present only in an amount of less than 10 bacterial cells per gram of egg product after 8 weeks and after 10 weeks storage at 4° C. after processing by the method of the invention.

In principle, the brief heat treatment may take place prior to, during or after the known pasteurization treatment, but in a preferred embodiment of the invention the brief heat treatment takes place prior to the pasteurization treatment. Exceptionally good results have been obtained therewith, as will be described in more detail below.

Preferably the temperature increase required for the brief heat treatment takes place very quickly, as does the temperature decrease following the brief heat treatment, so that the treatment of the egg product substantially takes place at the desired, relatively high temperature and the egg product is only subjected for a brief period of time to the higher temperature, not enough however, that it may have an adverse effect on the egg product, for example coagulation thereof.

According to another aspect of the invention, at least a portion of the temperature increase, over at least a 30° C. range, preferably over more than a 40° C. range, for the brief heat treatment is preferably carried out in less than 1 second, preferably less than 0.6 second.

According to a further aspect of the invention, a temperature decrease of more than 30° C., preferably more than 40° C., following the brief heat treatment may take place within 0.5 second, preferably 0.2 second.

According to another aspect of the invention, the brief heat treatment may be carried out by means of steam infusion, whereby the egg product is prevented from coming into contact with a hot surface of a piece of solid matter, as takes place in a conventional plate-type heat exchanger. Furthermore, the temperature decrease following the brief heat treatment may be carried out by expanding the egg product.

Steam infusion is a technique which is known per se, for example from WO-93/12673 for treating milk, and uses a so-called downflow heater to provide very quick heating. Steam infusion can be used to heat the egg product to the desired temperature, which temperature can be adjusted with great accuracy, whereby temperature differences within the egg product are minimized. Moreover, any contact between the egg product and a solid, heated surface, which might interfere with the process, is avoided.

The downflow heater of WO 93/12673 can be used during the brief heat treatment step of the present invention. Improved results are obtained by modifying the downflow heater by connecting a vacuum source to the steam infusion pressure chamber below the position at which the liquid egg product is supplied to the pressure chamber. More preferably, a vacuum line is connected to the pressure chamber above the bottom part of the pressure chamber which is cooled by means of a system of pipes provided therein. Application of a vacuum to the steam infusion pressure chamber facilitates flow of the liquid egg product from the supply pipe, through liquid distribution plates and through the plate channels into the steam infusion pressure chamber. Preferably, a vacuum of about 285–360 torr at a steam temperature of 75–80° C. or 360–675 torr at a steam temperature of 80–95° C. is applied to the pressure chamber. The vacuum may be supplied by a conventional vacuum source, e.g. a vacuum pump. Surprisingly, the application of a vacuum to the steam infusion pressure chamber does not substantially alter the heating profile of the egg product within the pressure chamber.

It is preferred to use a process called flashing for the quick temperature decrease after the brief heat treatment, wherein the liquid expands while water vapor is being released, so that the desired temperature decrease takes place. The flash vessel may be routinely adjusted so that the desired temperature decrease takes place in such a manner that the amount of water which was added to the egg product during the steam infusion is extracted again from the egg product.

Many egg treatment processes suffer from foaming of the egg product requiring additional steps to decrease or remove the foam. Applicants have discovered, however, that the process of the invention allows the production of an egg product with little or no foaming. Any foaming of the egg product is eliminated by breaking of the foam bubbles as a result of the evaporation during flash cooling. This latter elimination of the foam is moreover stimulated by mechanical contact between the egg product and the wall of the flash vessel.

In a preferred embodiment of the invention the egg product is first heated to a temperature of 50–55° C. before the egg product is subjected to the brief heat treatment at the temperature of 78° C. or more. As a result of this preheating of the egg product, which may take place by means of a conventional heat exchange surface and wherein the heat being released may be utilized in cooling the egg product at a later stage, a good starting temperature may be obtained for quick heating during the steam infusion heating, which takes place in a downflow heater.

The invention also relates to a device for heating a liquid egg product in order to obtain an extended shelf life, the device being provided with means for pasteurizing the egg product, by which means the egg product can be maintained at a temperature of more than about 60° C. for some time, for example a few minutes, e.g. up to about 10–20 minutes. The device according to the invention also has means for treating the egg product by steam infusion in order to heat the egg product briefly at an elevated temperature and has a flash vessel for expanding the briefly heated egg product.

According to one aspect of the invention, the means for carrying out the steam infusion is a downflow heater, having a height such that the egg product achieves a temperature which deviates less than 2° C. from the temperature of the steam. This small deviation makes it possible to set the desired temperature of the egg product with great accuracy and reliability, whereby the temperature can be achieved so quickly that a period of constant temperature commences while the egg product is falling.

Typically, the egg product will travel through the steam in the downflow heater at a rate of about 2–4 m/sec and will have a residence time in the downflow heater of about 0.5 second.

According to a more specific aspect of the invention the wall of the steam infuser is cooled, preferably by means of ice water, at any location where the egg product may come into contact with the wall. In practice it has become apparent that cooling of the wall is preferred for treatment of the egg product.

In order to more fully explain the invention, an embodiment of the method for treating an egg product will be described with reference to the Figures.

Figure 1:
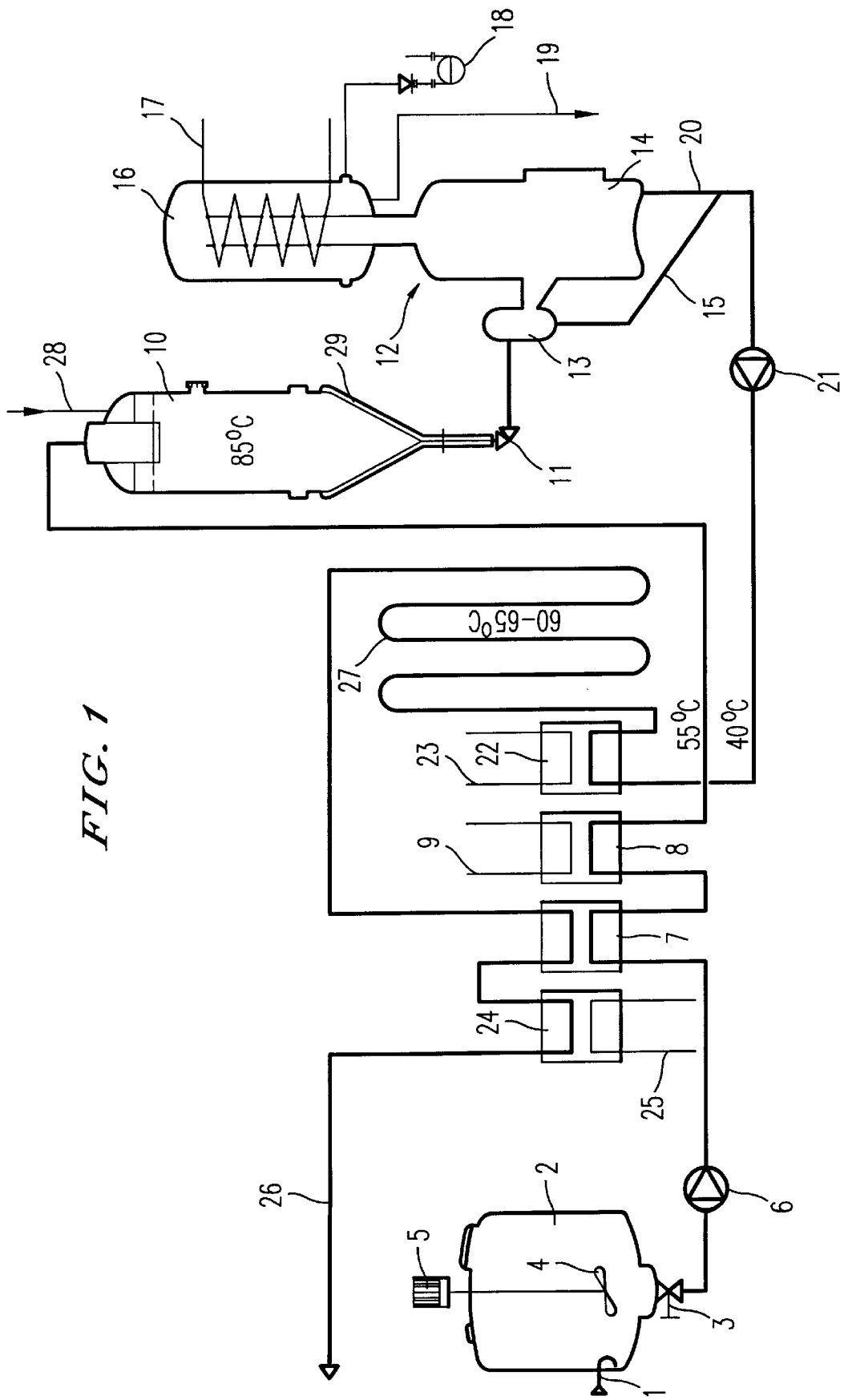
FIG. 1 is a schematic illustration of an installation for carrying out the treatment.

According to FIG. 1 the liquid egg product is charged to tank 2 by means of pipe 1, in which tank the egg product is maintained at a temperature of about 2° C. until the egg product is discharged from tank 2 by operating cock 3. During its stay in tank 2 the egg product is mixed by stirring means 4, which is driven by motor 5, so that a homogeneous liquid is obtained. After exiting tank 2 the egg product is carried to heat exchanger 7 and then to heat exchanger by means of pump 6. In heat exchanger 7 a first heating of the egg product takes place, utilizing heat which is withdrawn during the cooling of the egg product at a later stage. In heat exchanger 8 further heating to about 50–55° C. takes place by heat exchange with a pipe 9, through which hot water flows, for example.

After exiting heat exchanger 8 the egg product, which now has a temperature of about 50–55° C., is carried to downflow heater 10, in which the egg product is very quickly heated to a temperature of 78° C. or more, preferably about 85° C. Steam is supplied to the downflow heater 10 via pip 28 for heating. A suitable downflow heater for use in the invention is disclosed in WO-93/12673 which designates the United States and which is incorporated herein by reference in its entirety.

Inside the downflow heater 10 the egg product is heated to about 85° C. in 0.6 second, after which this temperature is maintained for 0.5 second while the egg product is falling in the downflow heater. To facilitate operation, it is preferable that both the temperature increase and the achieved temperature are uniformly spread over the egg product, which can be achieved by means of a properly adjusted downflow heater (10).

The downflow heater (10) is double-walled near its bottom side, so that a space 29 is created, through which a coolant, for example ice water, may be passed in order to cool the wall at that location.

The discharge cock 11 of the downflow heater 10 is controlled in such a manner that after having stayed inside the downflow heater 10 for the required period of time the egg product is discharged to the flash vessel 12, which is provided with a first-chamber 13 and a second chamber 14.

Cooling to about 40° C. takes place in 0.1 seconds, because the egg product present in chamber 13 will expand as a result of the pressure inside the flash vessel 12 being kept lower than the pressure inside the downflow heater 10. Preferably, the pressure in the flash vessel is about 50 to about 280 torr, although the exact pressure not critical so long as the pressure in the flash vessel is less than the pressure in the downflow heater. During this so-called flash cooling process the temperature decreases and water vapor is released. Preferably the expansion process is controlled in such a manner that all the water added in the downflow heater is removed from the egg product again. Furthermore it is important that any foam that has formed in the egg product is removed, on the one hand as a result of the egg product hitting the wall of the flash vessel 12, while on the other hand the evaporation process of the water causes the bubbles that are present to disintegrate.

The water vapor being extracted is condensed in condenser 16, which is provided with a cooling spiral 17, for example a pipe through which cold water flows. The low pressure inside the flash vessel 12 is maintained by means of vacuum pump 18, while the condensed water is discharged through pipe 19. The egg product which has not exited from the flash chamber 13 via pipe 15 exits the flash vessel via chamber 14 and pipe 20. The egg product is pumped along by means of fluid pump 21, during which pumping the egg product has a temperature of about 40° C.

The egg product is then carried to heat exchanger 22 in order to be heated to a temperature of 60–65° C., namely by means of hot water which flows through pipe 23. Subsequently the egg product flows into a well-insulated pipe 27, whose total capacity in relation to the flow rate, determines how long the egg product will be maintained at the said temperature of 60–65° C. This part of the treatment corresponds with the known and generally used pasteurization treatment of a liquid product.

The egg product then flows to heat exchanger 7 and heat exchanger 24 respectively. In heat exchanger 7, heat is exchanged with new untreated egg product, which must be heated from a holding temperature of 2° C., so that the amount of heat which is lost in the overall process is reduced. In heat exchanger 24 further cooling to a temperature of 2° C. takes place by means of heat exchange with cold water flowing through pipe 25.

The treated egg product is then carried, by means of pipe 26, to a machine which packs the egg product in desired quantities. The egg product treated and packed in this manner has a long shelf life and a very high quality. The treated egg product is preferably aseptically packed using conventional aseptic packaging techniques which are well known in the food processing art.

Figure 2:
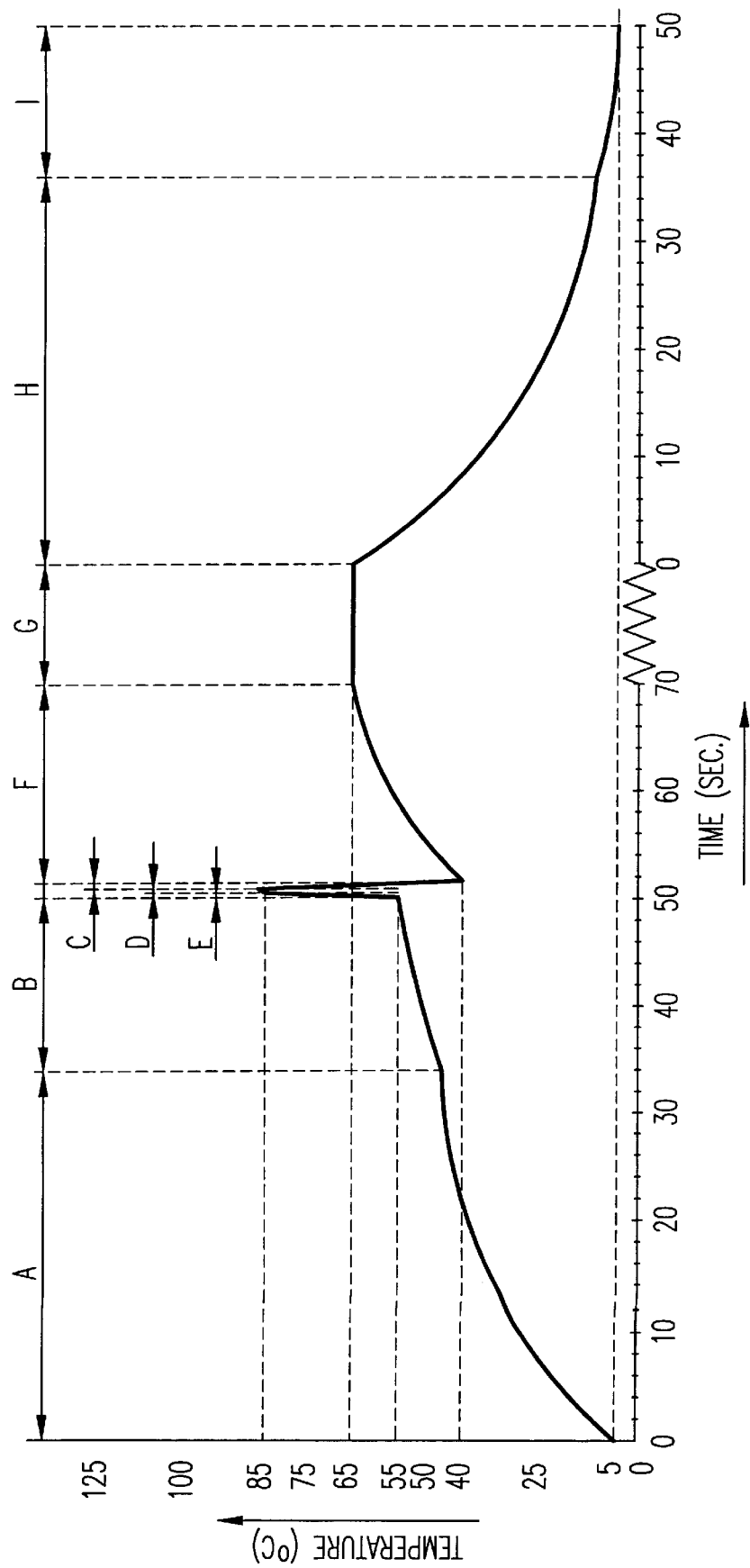
FIG. 2 graphically illustrates a curve of the temperature of the egg product during one embodiment of the treatment of the invention.

FIG. 2 shows the temperature curve of the egg product during the treatment process according to a preferred embodiment. The temperature (in °C.) is shown on the vertical axis and the time (in seconds) is shown on the horizontal axis. The duration of the various treatment steps is indicated by the letters A–I.

After the egg product has exited tank 2 and is carried to heat exchanger 7 by means of pump 6, heating in heat exchanger 7 and heat exchanger 8 respectively starts at time 0. The capacity of heat exchanger 7 is such that the egg product stays there for 34 seconds (period A), while heat is being exchanged with the egg product, which is cooled during the latter stage of the treatment. The egg product is thereby heated to a temperature of 45° C.

The egg product stays in heat exchanger 8 for 16 seconds (period B), where the egg product is further heated to 55° C. After 50 seconds (periods A and B) have lapsed from time 0, the egg product at 55° C. is charged to the downflow heater, where it is heated to a temperature of 85° C. in 0.6 second (period C). After being maintained at this temperature for 0.5 seconds (period D), the temperature of the egg product will decrease to 40° C. in 0.1 second (period E) as a result of being expanded in flash vessel 12. Following this, reheating of the egg product takes place in heat exchanger 22, where the egg product is heated to a temperature of 65° C. in 19 seconds (period F), which temperature is maintained or a few minutes. In the preferred embodiment, this period is 5 minutes (period G). The egg product flows through a well-insulated pipe 27, whose capacity is sufficient to realize the desired duration. Obviously, the length and/or diameter of pip 27 can be increased or decreased to adjust the length of the time period for this pasteurization step.

After this pasteurization treatment, cooling takes place for 36 seconds (period H), namely in heat exchanger 7, where heat is exchanged with the egg product to be heated. Further cooling to 2° C. takes place in heat exchanger 24 for 14 seconds (period I).

The process described in this embodiment provides an egg product of a very high quality, both with regard to taste and shelf life and with regard to all other functional properties. Furthermore the method used is very reliable, that is, relatively minor disruptions of the process appear to have hardly any effect on the quality of the treated egg product.

Other features of the invention will become apparent in the course of the following descriptions of exemplary embodiments which are given for illustration of the invention but are not intended to be limiting thereof.

EXAMPLES

Example 1

A number of tests have been carried out with various time/temperature combinations, in accordance with the method of the invention. During the testing, a batch of 5,000 kg egg product containing mixed egg white and egg yolk was treated with a flow rate of 2,000 liters per hour. Following the treatment, the pasteurized product was packed antiseptically in a number of packages, which were stored at a temperature of about 3° C.

The basic untreated product had a solid matter content of 23.2% by weight (±0.5), a whippability of 0.19 (i.e. the specific mass in $g/cm^3$ of 250 g whole egg plus 125 g sugar, whipped in a Hobart N50 mixer for 10 minutes at a temperature of approximately 22° C.) and a viscosity of 11 cps (±1). Further specifications include:

| | |
|---|---|
| Total bacteria count | 210,000 per gram |
| Coliform bacteria | 5,000 per gram |
| Bacillus cereus | 800 per gram |
| Streptococci | 4,000 per gram |
| Staphylococcus aureus | 60 per gram |
| Ferments | 1,000 per gram |
| Fungi | 300 per gram |
| E. coli | positive per 10 grams |
| Salmonella | positive per 25 grams |

During a period of 10 weeks one package was opened each week and its contents were examined, each time with the following results:

| | |
|---|---|
| Total bacteria count | <1,000 per grams |
| Coliform bacteria | <10 per gram |
| Bacillus cereus | <10 per gram |
| Streptococci | <10 per gram |
| Staphylococcus aureus | <100 per gram |
| Ferments | <10 per gram |
| Fungi | <10 per gram |
| E. coli | negative per 10 grams |
| Salmonella | negative per 25 grams |
| Listeria monocytogenes | negative per 25 grams |
| Sulphite-reducing bacteria | <10 per grams |

The functional and physical properties of the treated egg product remained practically unchanged.

Example 2

The process of Example 1 is repeated with the exception that the antiseptically packaged egg product is stored at a temperature of 20° C.

After storage at 20° C. for 8 weeks and 10 weeks, a package of the egg product was opened and analyzed to determine the total bacteria count. The total bacteria count is found to be less than 1000 bacteria per gram of liquid product.

Obviously, numerous modifications and variations of the present invention are possible in light of the above teachings. It is therefore to be understood that, within the scope of the appended claims, the invention may be practiced otherwise than as specifically described herein.

The Dutch priority application serial no. 1001250, filed Sep. 21, 1995 is incorporated herein by reference in its entirety.

What is claimed as new and desired to be secured by Letters Patent of the United States is:

1. A method for treating a liquid egg product containing egg white, egg yolk or a mixture thereof, comprising the steps of:

steam heating said liquid egg product at a temperature of 78° C. or higher for about 1.5 seconds or less, cooling the liquid egg product after said heat treating step over a range of more than 30° C. in 0.5 second or less; and thereafter pasteurizing the liquid egg product, wherein the liquid egg product is maintained at a temperature of about 60° C. or more for a time sufficient to pasteurize the liquid egg product.

2. The method of claim 1, wherein said steam heating step is conducted for about 1 second or less at 78–95° C.

3. The method of claim 2, wherein said steam heating step is conducted at a temperature of 80–90° C.

4. The method of claim 1, wherein said steam heating step comprises heating the liquid egg product over a range of at least 30° C. in less than 1 second.

5. The method of claim 4, wherein said heating step comprises heating the liquid egg product over a range of more than 40° C. in less than 1 second.

6. The method of claim 5, wherein said heating step comprises heating the liquid egg product over a range of more than 40° C. in less than 0.6 second.

7. The method of claim 1, wherein in said cooling step the liquid egg product is cooled over a range of more than 40° C. in 0.5 second or less.

8. The method of claim 7, wherein in said cooling step the liquid egg product is cooled over a range of more than 40° C. in 0.2 second or less.

9. The method of claim 1, wherein the liquid egg product does not come into contact with a hot surface during said steam heating.

10. The method of claim 1, further comprising cooling the heat treated liquid egg product by expansion cooling.

11. The method of claim 4, further comprising initially heating the liquid egg product to a temperature of about 50–60° C. prior to said heating step.

12. The method of claim 11, wherein said initial heating is to about 50–55° C.

13. The method of claim 9, further comprising applying a vacuum during said steam heating.

14. The method of claim 1, wherein the liquid egg product is heated using a heat exchanger in said pasteurizing step.

15. The method of claim 1, wherein the liquid egg product of said method has a total bacteria count of 1000 or less bacteria per gram of liquid egg product measured after storage for at least 8 weeks at a temperature up to 20° C.

16. The method of claim 15, wherein the liquid egg product of said method has a total bacteria count of 1000 or less bacteria per gram of liquid egg product measured after storage for 10 weeks at 20° C.

17. The method of claim 15, wherein the liquid egg product of said method has *B. cereus* bacterial count of 10 or less bacteria per gram of liquid egg product measured after storage for 8 weeks at 4° C.

18. The method of claim 15, wherein the liquid egg product of said method has a total bacteria count of 100 or less bacteria per gram of liquid egg product measured after storage for 8 weeks at 4° C.

19. The method of claim 1, wherein the liquid egg product further comprises at least one additive.

20. The method of claim 19, wherein the additive comprises sugars or salt.

21. A method for treating a liquid egg product containing egg white, egg yolk or a mixture thereof, comprising:

steam heating said liquid egg product at a temperature of 79° C. or higher for about 1.5 seconds or less;

flash cooling the steam heated liquid egg product over a range of more than 30° C. in 0.5 second or less; and pasteurizing the flash cooled liquid egg product, wherein said liquid egg product is maintained at a temperature of about 60° C. or more for a time sufficient to pasteurize said liquid egg product.

22. The method of claim 21, wherein said steam heating is conducted for about 1 second or less at 78–95° C.

23. The method of claim 22, wherein said steam heating is conducted at a temperature of 80–90° C.

24. The method of claim 21, wherein said steam heating comprises heating the liquid egg product over a range of at least 30° C. in less than 1 second.

25. The method of claim 21, comprising flash cooling the liquid egg product over a range of more than 40° C. in 0.5 second or less.

26. The method of claim 21, wherein said liquid egg product does not come into contact with a hot surface during said steam heating.

27. In a method of treating a liquid egg product containing egg white, egg yolk or a mixture thereof by pasteurizing, the improvement comprising, prior to pasteurizing said liquid egg product, steam heating said liquid egg product at a temperature of 78° C. or higher for about 1.5 seconds or less, and, subsequent to said steam heating and prior to said pasteurizing, flash cooling the steam heated liquid egg product over a range of more than 30° C. in 0.5 second or less.

28. The method of claim 27, wherein said steam heating is conducted for about 1 second or less at 78–95° C.

29. The method of claim 28, wherein said steam heating is conducted at a temperature of 80–90° C.

30. The method of claim 27, wherein said steam heating comprises heating the liquid egg product over a range of at least 30° C. in less than 1 second.

31. The method of claim 27, comprising flash cooling the liquid egg product over a range of more than 40° C. in 0.5 second or less.

32. The method of claim 27, wherein said liquid egg product does not come into contact with a hot surface during said steam heating.

* * * * *